US011789112B2

(12) United States Patent
Sezai

(10) Patent No.: US 11,789,112 B2
(45) Date of Patent: Oct. 17, 2023

(54) OBSERVATION APPARATUS, OBSERVATION METHOD, AND PROGRAM

(71) Applicant: JAPAN AEROSPACE EXPLORATION AGENCY, Tokyo (JP)

(72) Inventor: Toshihiro Sezai, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 231 days.

(21) Appl. No.: 17/283,763

(22) PCT Filed: Feb. 20, 2019

(86) PCT No.: PCT/JP2019/006289
§ 371 (c)(1),
(2) Date: Apr. 8, 2021

(87) PCT Pub. No.: WO2020/075319
PCT Pub. Date: Apr. 16, 2020

(65) Prior Publication Data
US 2021/0389413 A1    Dec. 16, 2021

(30) Foreign Application Priority Data

Oct. 9, 2018  (JP) ................................. 2018-191298
Feb. 12, 2019 (JP) ................................. 2019-022337

(51) Int. Cl.
*G01S 7/02*    (2006.01)
(52) U.S. Cl.
CPC ..................... *G01S 7/02* (2013.01)
(58) Field of Classification Search
None
See application file for complete search history.

(56) References Cited

U.S. PATENT DOCUMENTS 6,259,397 B1      7/2001  Sezai
2007/0248189 A1  10/2007  Ishikawa et al.
2020/0379082 A1* 12/2020  Sezai ................. G01S 7/354

FOREIGN PATENT DOCUMENTS

JP      2000-114850 A    4/2000
JP      2008-154285 A    7/2008
(Continued)

OTHER PUBLICATIONS

Supplementary European Search Report dated Jul. 5, 2022 in European Application No. 19872108.6.
(Continued)

*Primary Examiner* — Whitney Moore
(74) *Attorney, Agent, or Firm* — Saliwanchik, Lloyd & Eisenschenk

(57) ABSTRACT

An observation apparatus includes a signal processing unit that performs, using a square root signal of a received electric power signal from an antenna whose beam is scanned within a predetermined azimuthal angle range and a signal of an azimuthal angle of the scanned beam, a Fourier transform with respect to the azimuthal angle on the square root signal, divides a first azimuth frequency signal by a second azimuth frequency signal, the first azimuth frequency signal being obtained by performing the Fourier transform, the second azimuth frequency signal being obtained by performing a Fourier transform with respect to the azimuthal angle on a square root signal of an antenna electric power pattern, and fits the divided signal with exponential functions including real parts and imaginary parts in arguments by using Prony's method.

9 Claims, 3 Drawing Sheets

(56) References Cited

FOREIGN PATENT DOCUMENTS

JP          2014-215237  A    11/2014
WO    WO-2018/174172  A1     9/2018

OTHER PUBLICATIONS

Sezai, T., "Improvement of Directional Resolution of Rotational Radar by Prony Analysis of Deconvolved Antenna Output," *The Institute of Electronics, Information and Communication Engineers*, Aug. 17, 2017, 117(182):37-43, Institute of Electronics, Information and Communication Engineers (IEICE).
International Search Report dated May 7, 2019 in International Application No. PCT/JP2019/006289.

\* cited by examiner

OBSERVATION APPARATUS, OBSERVATION METHOD, AND PROGRAM

CROSS-REFERENCE TO RELATED APPLICATIONS

This application is the U.S. national stage application of International Patent Application No. PCT/JP2019/006289, filed Feb. 20, 2019, which claims the benefit under 35 U.S.C. § 119 of Japanese Application Nos. 2018-191298, filed Oct. 9, 2018; and 2019-022337, filed Feb. 12, 2019; the disclosures of each of which are incorporated herein by reference in their entirety.

TECHNICAL FIELD

The present invention relates to an observation apparatus, an observation method, and a program to be used for observation by a radar, for example.

BACKGROUND ART

For example, for observing objects to be observed at a radar, there is employed a method in which an antenna beam is rotated by rotation of an antenna or the like and intensity of electric power signals received at the antenna are simultaneously observed.

At this time, radio wave source information (position (azimuthal angle), intensity) is generally determined by searching for the peak point of the received signals within the rotation range, which involves a problem that the radio wave source information cannot be directly extracted. The present inventor has proposed a method of directly determining radio wave source information by using a deconvolution method and Prony's method (see Patent Literature 1 and Non-Patent Literature 1). This method is a method of theoretically determining radio wave source information and it is confirmed by numerical simulation that the radio wave source information can be obtained.

CITATION LIST

Patent Literature

Patent Literature 1: Japanese Patent Application Laid-open No. 2000-114850

Non-Patent Literature

Non-Patent Literature 1: SEZAI, T. "Improvement of Direction Resolution of Rotational Radar by Prony Analysis of Deconvolved Antenna Output", Technical Report of The Institute of Electronics, Information and Communication Engineers (IEICE TECHNICAL REPORT) [ISSN: 0913-5685]. Volume 117, Number 182. 2017, 08, 17. Pages 37-42*Sections 2-4*

DISCLOSURE OF INVENTION

Technical Problem

The method proposed by the present inventor uses an electric field signal received by the antenna and an electric field pattern signal of the antenna. Since the electric field signal and the electric field pattern signal are complex number signals, it is necessary to obtain the amplitudes and phases of the electric field signals and the electric field pattern signals. In conventional observation apparatuses, the amplitude value is generally obtained, but the phase is not obtained in most cases.

In the measurement of the antenna pattern, the measurement is often performed using a general-purpose facility, and thus it is not difficult to acquire the phase.

In contrast to the above, for example, if the frequency of the radio wave arriving at the antenna is accurately known as in radars or communications, in order to obtain the phase of the electric field signals received by the antenna, it is necessary to modify a receiver of the observation apparatus and add a phase obtaining function thereto or to prepare a new receiver. For example, if the frequency of the radio wave arriving at the antenna is not accurately known as in the search for radio waves, in order to obtain the phase of the electric field signal received by the antenna, a reference antenna is installed adjacent to the antenna for the apparatus, and the phase is acquired with reference to the radio wave received by the reference antenna. Thus, there is a problem that the addition of the phase obtaining function makes the receiver or the entire apparatus complicated and increases dimensions, weight, and cost.

In view of the above-mentioned circumstances, it is an object of the present invention to provide an observation apparatus, an observation method, and a program that are capable of directly obtaining radio wave source information by using a deconvolution method and Prony's method, without using the phase of an electric field signal received by an antenna.

Solution to Problem

In order to solve the above-mentioned problem, an observation apparatus according to an embodiment of the present invention includes a signal processing unit that performs, using a square root signal of a received electric power signal from an antenna whose beam is scanned within a predetermined azimuthal angle range and a signal of an azimuthal angle of the scanned beam, a Fourier transform with respect to the azimuthal angle on the square root signal, divides a first azimuth frequency signal by a second azimuth frequency signal, the first azimuth frequency signal being obtained by performing the Fourier transform, the second azimuth frequency signal being obtained by performing a Fourier transform with respect to the azimuthal angle on a square root signal of an antenna electric power pattern signal or an antenna electric field pattern signal of the antenna, and fits the divided signal with exponential functions including real parts and imaginary parts in arguments by using Prony's method.

A radio wave source distribution azimuth frequency function obtained in the course of the deconvolution processing is obtained by a Fourier transform with respect to the azimuthal angle on a distribution function of radio wave sources. It is possible to model the distribution of the radio wave sources in a case where it is the sum of a multiple of discrete radio wave sources. Each of the discrete radio wave sources can be considered as a point wave source, and thus its Fourier transform is represented by an exponential function whose amplitude is constant in the azimuth frequency. Therefore, the radio wave source distribution azimuth frequency function is represented as the sum of such exponential functions whose amplitude are constant.

Thus, the information on the radio wave source distribution can be directly obtained by using the method disclosed in Patent Literature 1, i.e., by fitting the radio wave source distribution azimuth frequency function with exponential functions by using Prony's method. Further, when exponential function components are extracted from the radio wave source distribution azimuth frequency function by using the method disclosed in Non-Patent Literature 1, it is possible to discriminate the exponential functions by using the values of the real parts in the arguments and to exclude exponential functions caused by noise.

The radio wave source distribution function is a function of the azimuthal angle, and the amplitude thereof is a complex number. However, phase information is rarely required during radio wave source observation. For this reason, even if the amplitude of the radio wave source distribution function is regarded as a real number and the result is obtained by the methods disclosed in Patent Literature 1 and Non-Patent Literature 1 using a square root signal of a received electric power signal from an antenna and a square root signal of an antenna electric power pattern or an antenna electric field pattern signal of the antenna, there is no problem practically.

It is favorable that the signal processing unit extracts radio wave source candidates, whose absolute values of the real parts are equal to or smaller than a predetermined value, among radio wave source candidates obtained by the fitting.

It is favorable that the signal processing unit obtains information for determining actual radio wave sources among the extracted radio wave source candidates from the exponential functions.

It is more favorable that the information for determining the actual radio wave sources among the extracted radio wave source candidates includes values of relative amplitudes of the radio wave source candidates, values of the real parts, and values of the azimuthal angles.

It is favorable that the observation apparatus according to the present invention further includes a display unit that displays information on the extracted radio wave source candidates and the information for determining the actual radio wave sources.

It is favorable that the signal processing unit performs low-pass filtering on the divided signal before fitting by using Prony's method.

It is favorable that the observation apparatus according to the present invention further includes one of antenna systems among an antenna system including a beam antenna with an antenna rotating device that rotates the beam antenna, an antenna system with an electronic antenna beam scan apparatus, and an antenna system including a beam antenna with an antenna movement apparatus that moves the beam antenna, as the antenna by which the beam is scanned within the predetermined azimuthal angle range.

It is favorable that the observation apparatus according to the present invention further includes: a transmitter that supplies the antenna with transmitted electric power; and a switch unit that performs switching between transmitting and receiving.

An observation method according to an embodiment of the present invention includes the steps of: performing, using a square root signal of a received electric power signal from an antenna whose beam is scanned within a predetermined azimuthal angle range and a signal of an azimuthal angle of the scanned beam, a Fourier transform with respect to the azimuthal angle on the square root signal of the received electric power signal; dividing a first azimuth frequency signal by a second azimuth frequency signal, the first azimuth frequency signal being obtained by performing the Fourier transform, the second azimuth frequency signal being obtained by performing a Fourier transform with respect to the azimuthal angle on a square root signal of an antenna electric power pattern or an antenna electric field pattern signal of the antenna; and fitting the divided signal with exponential functions including real parts and imaginary parts in arguments by using Prony's method.

A program according to an embodiment of the present invention causes a computer to execute the steps of: performing, using a square root signal of a received electric power signal from an antenna whose beam is scanned within a predetermined azimuthal angle range and a signal of an azimuthal angle of the scanned beam, a Fourier transform with respect to the azimuthal angle on the square root signal of the received electric power signal; dividing a first azimuth frequency signal by a second azimuth frequency signal, the first azimuth frequency signal being obtained by performing the Fourier transform, the second azimuth frequency signal being obtained by performing a Fourier transform with respect to the azimuthal angle on a square root signal of an antenna electric power pattern or an antenna electric field pattern signal of the antenna; and fitting the divided signal with exponential functions including real parts and imaginary parts in arguments by using Prony's method.

Advantageous Effects of Invention

According to the present invention, it is possible to directly obtain radio wave source information by using a deconvolution method and Prony's method without using the phase of an electric field signal received by an antenna.

MODE(S) FOR CARRYING OUT THE INVENTION

Hereinafter, an embodiment of the present invention will be described with reference to the drawings.

Figure 1:
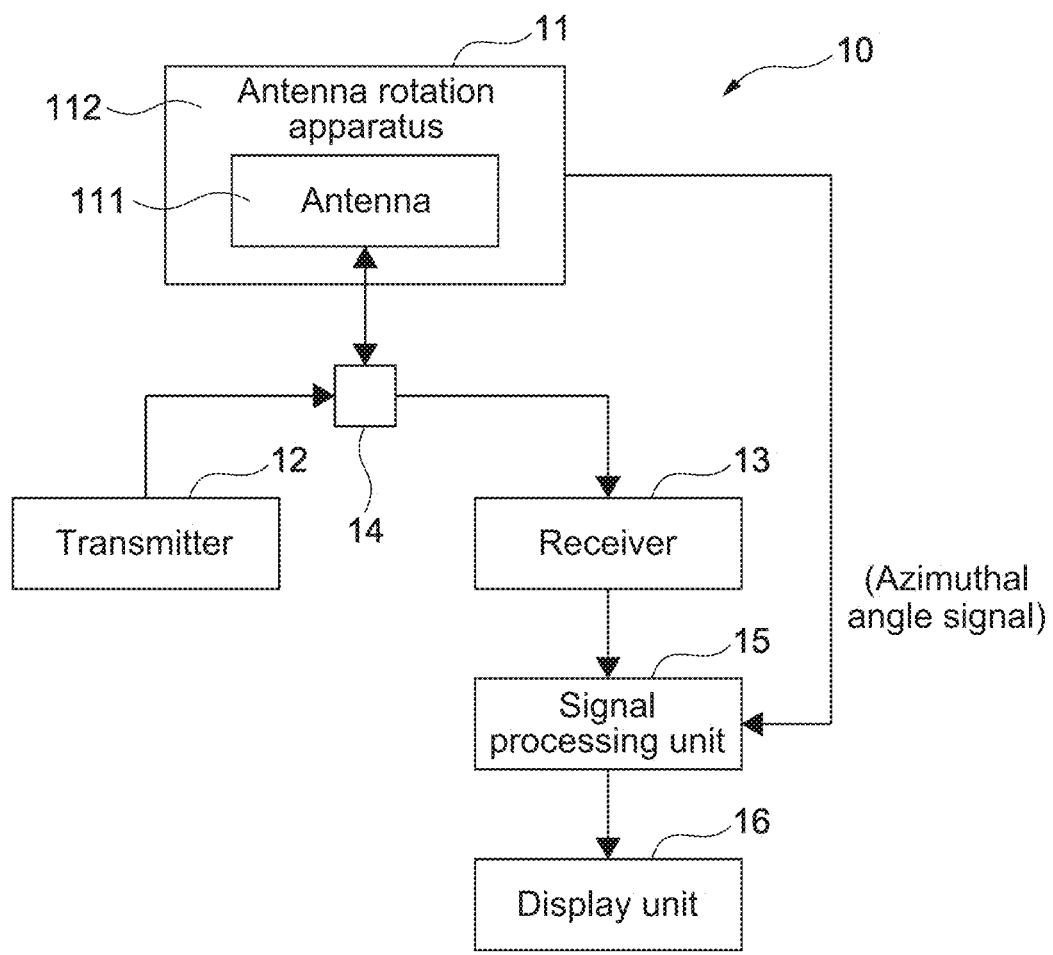
FIG. 1 is a block diagram showing an observation apparatus according to an embodiment of the present invention.

FIG. 1 is a block diagram showing an observation apparatus according to the embodiment of the present invention. In this embodiment, the observation apparatus according to the present invention is applied to a radar apparatus.

As shown in FIG. 1, an observation apparatus 10 includes an antenna system 11, a transmitter 12, a receiver 13, a switch unit 14, a signal processing unit 15, and a display unit 16.

The observation apparatus 10 is a radar apparatus. The observation apparatus 10 is an apparatus that radiates radio waves toward targets and observes reflected waves thereof to thereby measure radio wave source information of the targets.

The antenna system 11 scans an antenna beam within a predetermined azimuthal angle range. The antenna system 11 includes a beam antenna 111 and an antenna rotation apparatus 112 that rotates the beam antenna 111. The antenna rotation apparatus 112 rotates the beam antenna 111 in a direction in which the resolution of the beam antenna 111 is to be improved. The antenna system 11 outputs a signal of an azimuthal angle of a beam scanned according to rotation of the antenna rotation apparatus 112. Any antenna including a dipole-based antenna, a horn antenna, a parabolic antenna, an array antenna, and the like can be used as the beam antenna.

The transmitter 12 supplies the beam antenna 111 with transmitted electric power.

The receiver 13 transforms received electric power signals of the beam antenna 111 into square root signals thereof.

The switch unit 14 switches between transmitting and receiving.

The signal processing unit 15 inputs the square root signals of the received electric power signals from the receiver 13 and the signals of the azimuthal angle from the antenna system 11, performs predetermined signal processing, and outputs information regarding radio wave source candidates, the relative intensity thereof, and values of real parts of exponential function arguments, positions (azimuthal angles), and the like. The real parts are to be described later.

On the basis of the output from the signal processing unit 15, the display unit 16 displays information regarding the relative intensity, the azimuthal angles, and the like of the information regarding the relative intensity of the radio wave source candidates, the values of the real parts of the exponential function arguments, and the positions (azimuthal angles).

Figure 2:
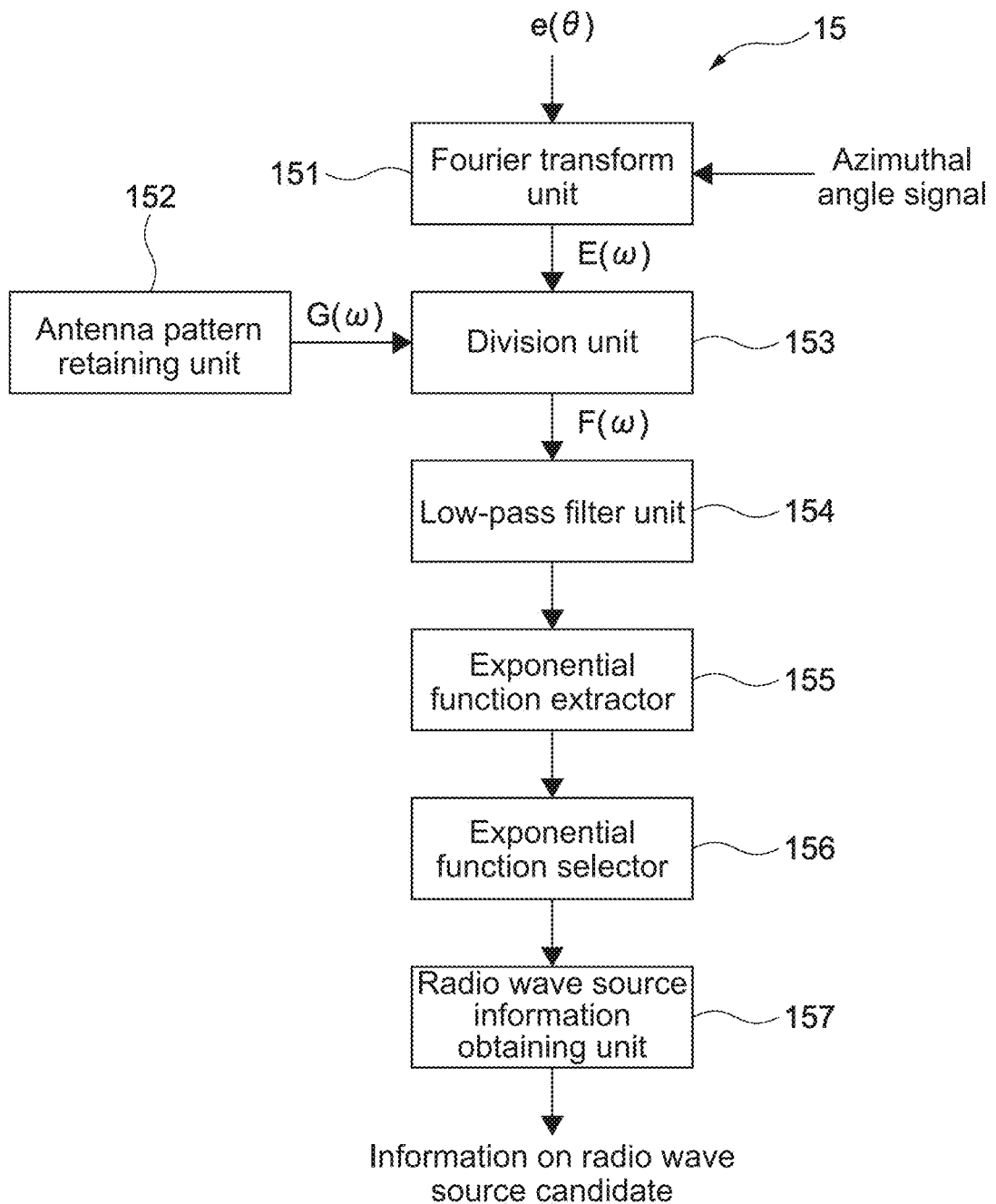
FIG. 2 is a block diagram showing a configuration of a signal processing unit of the observation apparatus shown in FIG. 1.

FIG. 2 is a block diagram showing a configuration of the above-mentioned signal processing unit 15.

As shown in FIG. 2, the signal processing unit 15 includes a Fourier transform unit 151, an antenna pattern signal retaining unit 152, a division unit 153, a low-pass filter unit 154, an exponential function extractor 155, an exponential function selector 156, and a radio wave source information obtaining unit 157.

The Fourier transform unit 151 calculates an azimuth frequency signal $E(\omega)$ by performing a Fourier transform with respect to the azimuthal angle on a square root signal $e(\theta)$ of a received electric power signal which has been input. Here, "$\theta$" denotes an azimuthal angle and "$\omega$" denotes an azimuth frequency.

The antenna pattern signal retaining unit 152 retains an azimuth frequency signal $G(\omega)$ obtained by performing a Fourier transform with respect to the azimuthal angle on a square root signal $g(\theta)$ of an antenna electric power pattern to be used in a radar apparatus of the beam antenna 111.

The division unit 153 divides the azimuth frequency signal $E(\omega)$ by the azimuth frequency signal $G(\omega)$. The division value is an azimuth frequency signal $F(\omega)$ obtained by performing a Fourier transform with respect to the azimuthal angle on a radio wave source distribution. That is, the division unit 153 calculates $F(\omega)=E(\omega)/G(\omega)$.

The low-pass filter unit 154 performs low-pass filtering on the output signals from the division unit 153. As the azimuth frequency band is limited physically in the signal obtained by performing a Fourier transform on the square root signal of the antenna electric power pattern, it cannot have components beyond the band. However, division signals (radio wave source distribution azimuth frequency signals) which are obtained by signal processing in the division unit 153 includes azimuth frequency components beyond the band. It is generated due to a difference between actual processing and ideal processing. If the signal which has the components beyond the band is used for processing at a subsequent stage, the signal would be deteriorated. Therefore, here, low-pass filtering is performed to remove the signal components beyond the band, so that the deterioration of the signal is inhibited.

The exponential function extractor 155 fits signals, which are obtained by dividing in the division unit 153 and subjected to low-pass filtering, with exponential functions of $\exp(\alpha_i-j\theta_i)$ including the real part $\alpha_i$ and the imaginary $\theta_i$ in the argument by using Prony's method.

The exponential function selector 156 sets a threshold on the value of $\alpha_i$ in advance and selects exponential functions with $\alpha_i$s equal to or smaller than the threshold (as radio wave source candidates).

The radio wave source information obtaining unit 157 obtains radio wave source information from the exponential functions selected by the exponential function selector 156. The radio wave source information is a value of the relative intensity of each radio wave source candidate, the position (azimuthal angle), or the like.

Next, an operation of the observation apparatus 10 thus configured will be described.

While the beam antenna 111 is being rotated by the antenna rotation apparatus 112, the transmitted electric power is supplied to the beam antenna 111 from the transmitter 12 and the radio waves are radiated from the beam antenna 111.

When the radio waves radiated from the beam antenna 111 are reflected on scatterers (targets) and are returned, the beam antenna 111 outputs the received radio waves. The received radio waves via the switch unit 14 are transformed into a square root signal of a received electric power signal by the receiver 13. Then, the transformed signal is input into the signal processing unit 15.

In the signal processing unit 15, the following signal processing is performed.

Calculate the azimuth frequency signal $E(\omega)$ obtained by performing a Fourier transform with respect to the azimuthal angle on the square root signal $e(\theta)$ of the received electric power signal.

Divide this azimuth frequency signal $E(\omega)$ by the azimuth frequency signal $G(\omega)$ obtained by performing a Fourier transform with respect to the azimuthal angle on the square root signal $g(\theta)$ of the antenna electric power pattern in a radar apparatus of the beam antenna 111.

Perform low-pass filtering on the division signal.

Fit the signal, on which low-pass filtering is performed, with exponential functions including the real parts $\alpha_i$s and the imaginary parts $\theta_i$s in the arguments by using Prony's method.

Set the value of $\alpha_i$ for the threshold in advance and select the exponential functions of $\alpha_i$ equal to or smaller than the threshold (as radio wave source candidate).

Obtain the radio wave source information from the selected exponential function.

The values of the relative intensity of each radio wave source candidate and the position (azimuthal angle) are displayed by the display unit 16. The display unit 16 displays the information in the form of a table or the like.

Next, results of numerical simulation performed for confirming the effects according to the present invention will be described.

Radio wave source information was reviewed in the case that an aperture antenna (antenna beam width: 1 degree) with uniform distribution whose length is 50.42 times as large as the wavelength was used as the antenna according to the present invention, radio waves were radiated by the antenna while rotating the antenna from −45 degrees to +45 degrees, and the radio waves which were scattered by identical point scatterers located in directions of −0.5 degrees and +0.5 degrees at an equal distance from the antenna and returned to the antenna were obtained in an environment where a signal-to-noise ratio was 20 dB.

The low-pass filter passes signals within 0.8 (degrees$^{-1}$), for example, with the absolute value in the azimuth frequency.

F(ω) low-pass filtered is fit with the exponential functions including the real parts $α_i$ and the imaginary parts $θ_i$s in the arguments by using Prony's method. The exponential functions whose real parts $α_i$ are equal to or smaller than 0.01 as an absolute value are selected. The radio wave source information of the selected exponential functions and the real parts $α_i$ of the exponential function arguments are shown in Table 1 (information of top five radio wave source intensity).

TABLE 1

| | Relative intensity | Relative intensity [dB] | $α_i$ | Azimuth [deg] |
|---|---|---|---|---|
| 1 | 1.000 | 0.000 | −0.0016 | −0.535 |
| 2 | 0.841 | −0.752 | −0.0030 | 0.487 |
| 3 | 0.038 | −14.249 | −0.0072 | −2.038 |
| 4 | 0.031 | −15.079 | 0.0003 | −30.003 |
| 5 | 0.031 | −15.133 | 0.0004 | 33.873 |

Figure 3:
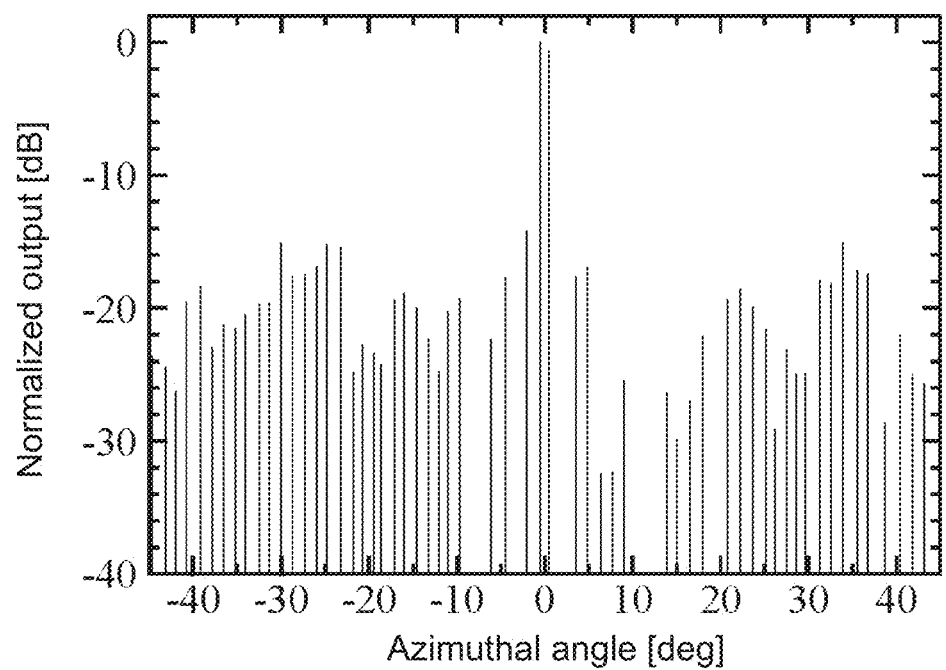
FIG. 3 is a graph showing an example of simulation results of radio wave source information according to the embodiment of the present invention.

In addition, results showing the radio wave source information sources obtained by the simulation are shown in FIG. 3.

Thus, it can be seen that the radio wave sources having substantially the same intensity are located in two azimuth directions closer to the actual radio wave source positions on the basis of the radio wave source information obtained in accordance with the present invention. Further, information indicating the presence of many radio wave sources in directions away from these directions is also shown. However, the intensity is lower by about 13 dB or more, and thus it can be determined as being caused by noise.

Figure 4:
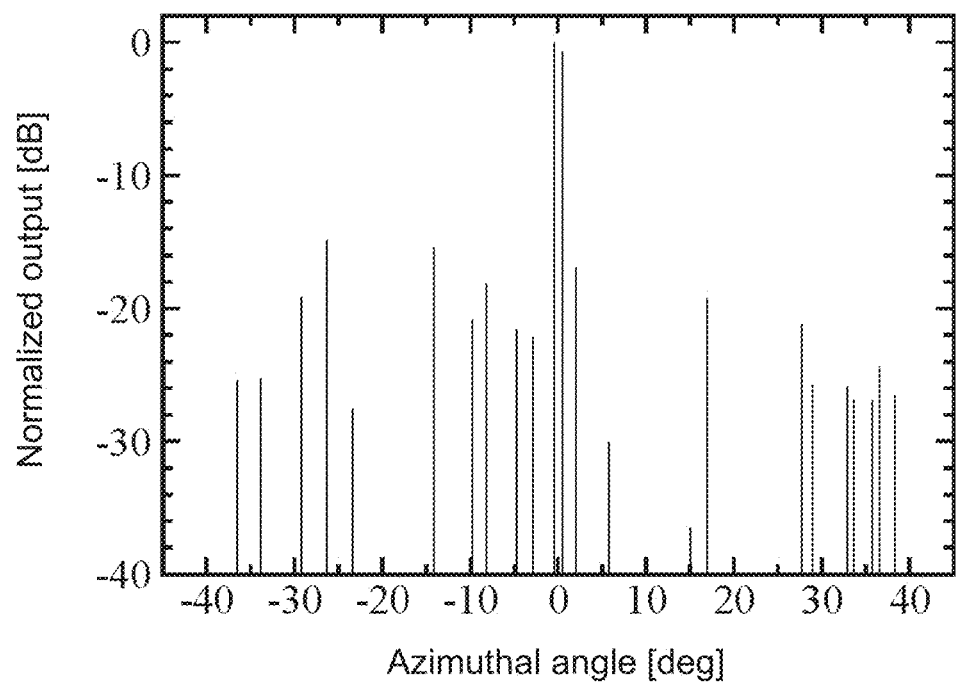
FIG. 4 is a graph showing an example of simulation results of radio wave source information according to a method shown in Non-Patent Literature 1.

As a comparative example, results obtained by the method shown in Non-Patent Literature 1 in the same manner as the above-mentioned numerical simulation are shown in Table 2 and FIG. 4.

TABLE 2

| | Relative intensity | Relative intensity [dB] | $α_i$ | Azimuth [deg] |
|---|---|---|---|---|
| 1 | 1.000 | 0.000 | 0.0001 | −0.485 |
| 2 | 0.843 | −0.742 | 0.0001 | 0.496 |
| 3 | 0.032 | −14.900 | 0.0075 | −26.308 |
| 4 | 0.029 | −15.440 | 0.0048 | −14.179 |
| 5 | 0.020 | −17.020 | −0.0043 | 1.979 |

In comparison between Tables 1 and 2, the intensity of the radio wave sources obtained by the present invention is substantially the same as that obtained by Non-Patent Literature 1. The azimuth accuracy of the radio wave sources obtained by the present invention is lower than the azimuth accuracy of the radio wave sources obtained by Non-Patent Literature 1. In comparison between FIGS. 3 and 4, the number of outputs not from the radio wave sources for the present invention is larger than that for Non-Patent Literature 1. As described above, in comparison with Non-Patent Literature 1, the performance of obtaining the radio wave source information for the present invention becomes worse than that for the invention of Non-Patent Literature 1, but the azimuth accuracy is as high as the error which is 0.035 degrees at worst. It can be easily determined that the outputs not from the radio wave sources are caused by noise. Therefore, also in the present invention, the radio wave source information can be obtained with high accuracy.

The present invention is not limited to the above-mentioned embodiment, various modifications can be made, and those fall within the range of the technical ideas of the present invention.

In the above-mentioned embodiment, the antenna pattern signal retaining unit 152 retains an azimuth frequency signal G(ω) obtained by performing a Fourier transform with respect to the azimuthal angle on a square root signal g(θ) of an antenna electric power pattern to be used in a radar apparatus of the beam antenna 111, and the division unit 153 divides the azimuth frequency signal E(ω) by the azimuth frequency signal G(ω) and obtains an azimuth frequency signal F(ω). In the present invention, an antenna electric field pattern signal of the antenna may be used in place of the square root signal g(θ) of the antenna electric power pattern.

The above-mentioned embodiment has been described as one using a mechanical antenna rotating device as means for moving a pointing direction of the antenna beam toward radio wave sources to be observed. Alternatively, an electronic antenna beam scanning means, means for moving an antenna beam as mounted on a mobile platform such as an aircraft or satellite, or the like can be used as the means for moving the pointing direction of the antenna beam.

Further, in the above-mentioned embodiment, the observation apparatus includes the antenna system, the display unit, and the like. Alternatively, the observation apparatus may be configured to be input with received electric power signals and angular signals from an external antenna system. Further, the observation apparatus may be configured to output information to an external display apparatus and make the display apparatus display the information. Alternatively, the observation apparatus may perform predetermined determination processing on the basis of the radio wave source information obtained from the exponential functions without displaying the information.

Further, in the above-mentioned embodiment, the antenna pattern signal retaining unit retains an azimuth frequency signal G(ω) obtained by performing a Fourier transform with respect to the azimuthal angle on a square root signal g(θ) of an antenna electric power pattern of the beam antenna. However, in a case where the square root signal g(θ) of the antenna electric power pattern of the beam antenna dynamically varies, the square root signal g(θ) may be configured to be input every time it varies, to thereby calculate the azimuth frequency signal G(ω).

The threshold of the real part $α_i$ exemplified in the above-mentioned embodiment may be adaptively variable.

REFERENCE SIGNS LIST

10 observation apparatus
11 antenna system
12 transmitter
13 receiver
14 switch unit
15 signal processing unit
16 display unit
151 Fourier transform unit
152 antenna pattern signal retaining unit
153 division unit
154 low-pass filter unit
155 exponential function extractor
156 exponential function selector
157 radio wave source information obtaining unit

The invention claimed is:

1. An observation apparatus, comprising
an antenna system comprising an antenna; and
a processor in operable communication with the antenna, wherein the processor
performs, using a square root signal of a received electric power signal from an antenna whose beam is scanned within a predetermined azimuthal angle range and a signal of an azimuthal angle of the scanned beam, a Fourier transform with respect to the azimuthal angle on the square root signal,
divides a first azimuth frequency signal by a second azimuth frequency signal, the first azimuth frequency signal being obtained by performing the Fourier transform, the second azimuth frequency signal being obtained by performing a Fourier transform with respect to the azimuthal angle on a square root signal of an antenna electric power pattern, and
fits the divided signal with exponential functions including real parts and imaginary parts in arguments by using Prony's method.

2. The observation apparatus according to claim 1, wherein
the processor extracts radio wave source candidates, whose absolute values of the real parts are equal to or smaller than a predetermined value, among radio wave source candidates obtained by the fitting.

3. The observation apparatus according to claim 2, wherein
the processor obtains information for determining actual radio wave sources among the extracted radio wave source candidates from the exponential functions.

4. The observation apparatus according to claim 3, wherein
the information for determining the actual radio wave sources among the extracted radio wave source candidates includes values of relative amplitudes of the radio wave source candidates, values of the real parts, and values of the azimuthal angles.

5. The observation apparatus according to claim 3, further comprising:
a display in operable communication with the processor, wherein the display displays information on the extracted radio wave source candidates and the information for determining the actual radio wave sources.

6. The observation apparatus according to claim 1, wherein
the processor performs low-pass filtering on the divided signal before fitting by using Prony's method.

7. The observation apparatus according to claim 1, wherein:
the antenna is a beam antenna and the antenna system comprises an antenna rotating device that rotates the beam;
the antenna system comprises an electronic antenna beam scan apparatus; or
the antenna is a beam antenna and the antenna system is an antenna movement apparatus that moves the beam antenna.

8. The observation apparatus according to claim 1, further comprising:
a power transmitter that supplies the antenna with electric power; and
a switch that performs switching between transmitting and receiving.

9. An observation method, comprising:
using an antenna to scan a beam within a predetermined azimuthal angle to generate an electric field signal;
receiving, by a processor in operable communication with the antenna, the electric field signal;
performing, using a square root signal of a received electric power signal from an antenna whose beam is scanned within a predetermined azimuthal angle range and a signal of an azimuthal angle of the scanned beam, a Fourier transform with respect to the azimuthal angle on the square root signal;
dividing a first azimuth frequency signal by a second azimuth frequency signal, the first azimuth frequency signal being obtained by performing the Fourier transform, the second azimuth frequency signal being obtained by performing a Fourier transform with respect to the azimuthal angle on a square root signal of an antenna electric power pattern; and
fitting the divided signal with exponential functions including real parts and imaginary parts in arguments by using Prony's method.

* * * * *